(12) United States Patent
Brown (10) Patent No.: US 7,703,825 B2
(45) Date of Patent: Apr. 27, 2010

(54) TRUCK BED EXTENDER

(76) Inventor: Chad Brown, 5444 Yonge Street, #9, Toronto, Ontario (CA) M2N 6I4

( * ) Notice: Subject to any disclaimer, the term of this patent is extended or adjusted under 35 U.S.C. 154(b) by 554 days.

(21) Appl. No.: 11/498,405

(22) Filed: Aug. 2, 2006

(65) Prior Publication Data

US 2008/0030038 A1    Feb. 7, 2008

(51) Int. Cl.
*B60P 3/06* (2006.01)
(52) U.S. Cl. .................... 296/26.08; 414/537; 224/403; 224/519
(58) Field of Classification Search ............... 296/158, 296/26.08, 26.09, 50, 61, 62, 59, 60; 108/44; 414/537; 14/69.5; 224/402–405, 492, 488, 224/489, 519–521; 280/762, 769
See application file for complete search history.

(56) References Cited

U.S. PATENT DOCUMENTS

| | | | | |
|---|---|---|---|---|
| 3,650,443 | A * | 3/1972 | Haskett et al. | 224/513 |
| 4,813,584 | A * | 3/1989 | Wiley | 224/510 |
| 4,906,015 | A | 3/1990 | LaCroix et al. | |
| 5,016,897 | A * | 5/1991 | Kauffman | 280/402 |
| 5,033,662 | A | 7/1991 | Godin | |
| 5,458,389 | A * | 10/1995 | Young | 296/26.08 |
| 5,494,393 | A * | 2/1996 | Schrunk | 414/537 |
| 5,658,033 | A | 8/1997 | Delaune | |
| 6,113,171 | A | 9/2000 | Stearns | |
| 6,336,413 | B1 * | 1/2002 | Ball | 108/44 |
| 6,648,391 | B1 | 11/2003 | Whiteford et al. | |
| 6,695,565 | B1 * | 2/2004 | Franchuk | 414/537 |
| 6,698,994 | B2 * | 3/2004 | Barrett | 414/462 |
| 6,874,804 | B2 * | 4/2005 | Reese et al. | 280/477 |
| 7,207,615 | B2 * | 4/2007 | St. Romain | 296/26.09 |
| 7,243,966 | B1 * | 7/2007 | Sheldon | 296/26.08 |
| 7,503,135 | B2 * | 3/2009 | Chafin | 40/591 |
| 2004/0009055 | A1 * | 1/2004 | Scherle | 414/537 |
| 2004/0178649 | A1 * | 9/2004 | Agan | 296/26.08 |
| 2004/0245795 | A1 * | 12/2004 | Hansen | 296/26.08 |
| 2005/0006921 | A1 * | 1/2005 | Chumley et al. | 296/75 |
| 2005/0092213 | A1 * | 5/2005 | Wilson et al. | 108/44 |
| 2005/0263555 | A1 * | 12/2005 | Hail et al. | 224/402 |
| 2008/0279664 | A1 * | 11/2008 | Eidsmore | 414/480 |
| 2008/0284194 | A1 * | 11/2008 | Bower et al. | 296/61 |

* cited by examiner

*Primary Examiner*—Jason S Morrow (57) ABSTRACT

An extender for a bed of a truck, wherein the extender comprises a frame that has front end, a rear end and sides. At least one, and preferably two, spaced apart connector brackets extend outwardly away from the rear end of the frame. The connector brackets are designed to rest upon an end portion of the truck bed when the truck's tailgate has been removed. The connector brackets are preferably bolted into the truck bed, but may be frictionally engaged therewith. A strut extends downwardly from the frame and is connected to a rearwardly extending longitudinal support. The support is secured to the truck's trailer hitch. The extender is therefore supported by both the connector brackets and the hitch. The length of the strut is vertically adjustable to allow the extender to be secured to any type of truck. The longitudinal support is also slidably adjustable onto the trailer hitch to provide for the extender to be secured to any type of truck. The frame preferably is formed with a pair of spaced-apart wheel wells so as to receive a pair of wheels of a vehicle loaded onto the truck bed. The frame may be provided with a pair of ramps to assist in loading of the truck and with an extended hitch to allow a trailer to be connected to the truck.

17 Claims, 9 Drawing Sheets

TRUCK BED EXTENDER

BACKGROUND OF THE INVENTION

1. Technical Field

This invention generally relates to automotive vehicles. More particularly, the invention relates to an extender for a truck bed. Specifically, the invention relates to an extender that is secured to both the truck bed and to a hitch mounted on the truck and that is capable of supporting a heavy weight thereon, such as a six-wheeled all terrain vehicle.

2. Background Information

There are many new mid-size to large trucks where the cab is extended to accommodate an extra row of seats. This design change in the vehicles tends to take up some of the exterior space in the truck bed and thereby restricts the load that can be carried on the bed. If the truck is used to transport small vehicles such as small all terrain vehicles or snowmobiles, then the tailgate of the truck can be left open. The open tailgate provides a few extra feet of truck bed support for these smaller vehicles. However, heavier and longer vehicles, such as six-wheeled all terrain vehicles are common on farms and are often used for hunting trips. These larger vehicles are much heavier and because of the increased weight can potentially damage the truck's tailgate as they are loaded onto the bed. The weight of the larger vehicles can also damage the tailgate during transportation.

There is therefore a need in the art for a truck bed extender that allows for the loading and transportation of heavy vehicles.

SUMMARY OF THE INVENTION

The device of the present invention is an extender for a truck bed where the truck's tailgate is removed. The extender comprises a frame that has front end, a rear end and sides. At least one, and preferably two, connector brackets extend outwardly away from the rear end of the frame. The brackets rest upon an end portion of the truck bed when the truck's tailgate has been removed. The connector brackets are preferably bolted into the truck bed, but may be frictionally engaged therewith. A strut extends downwardly from the frame and is connected to a longitudinal support that extends rearwardly therefrom and is designed to engage a hitch mounted on the truck. When secured in place, the extender is supported by both the connector brackets and the hitch. The length of the strut is vertically adjustable to allow the extender to be secured to any type of truck. The frame is provided with a pair of spaced-apart wheel wells that allow it to receive a pair of wheels of a vehicle loaded onto the truck bed. The frame is preferably also provided with a pair of ramps to assist in loading of the truck and with a secondary hitch to allow a trailer to be connected to the truck.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Referring to FIGS. 1-6, there is shown a truck bed extender in accordance with the present invention and generally indicated at 10. Extender 10 comprises a generally rectangular frame 12 that includes a front bar 14, a rear bar 16 and two side bars 18, 20 that are connected to one another to form a generally rectangular support. A plurality of crossbars 22, 24, 26 connect the front and rear bars 14, 16 together and act both to strengthen and stabilize frame 12.

Figure 1:
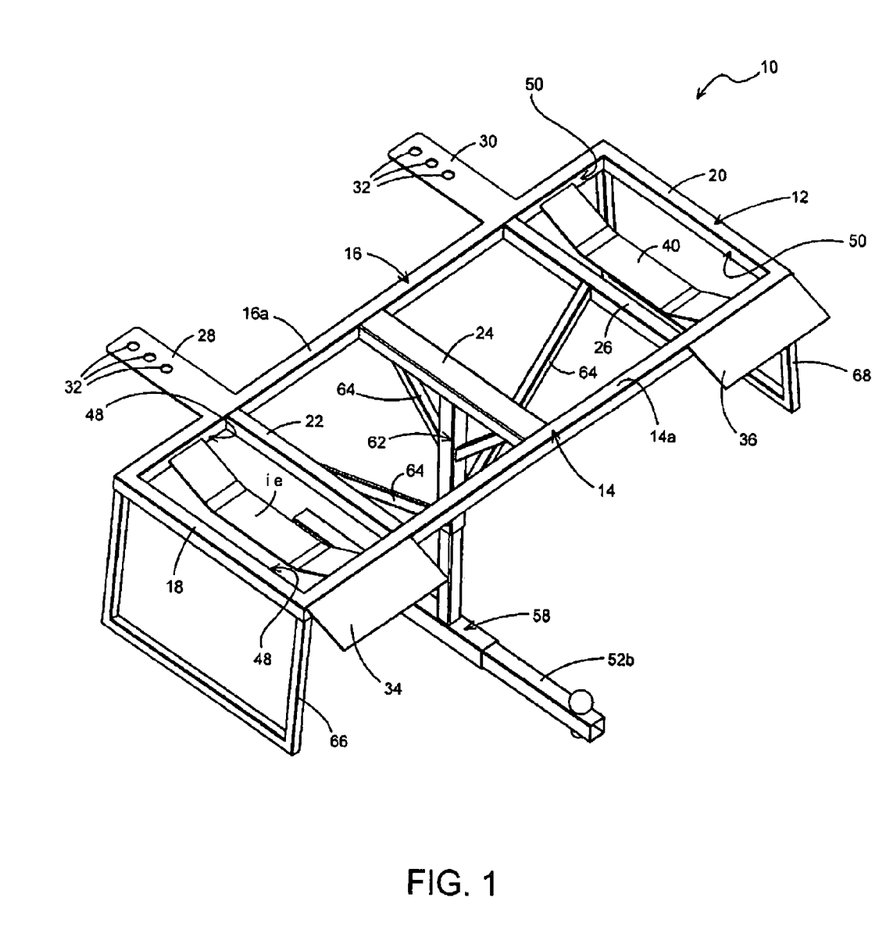
FIG. 1 is a perspective view of the truck bed extender in accordance with the present invention.
Figure 2:
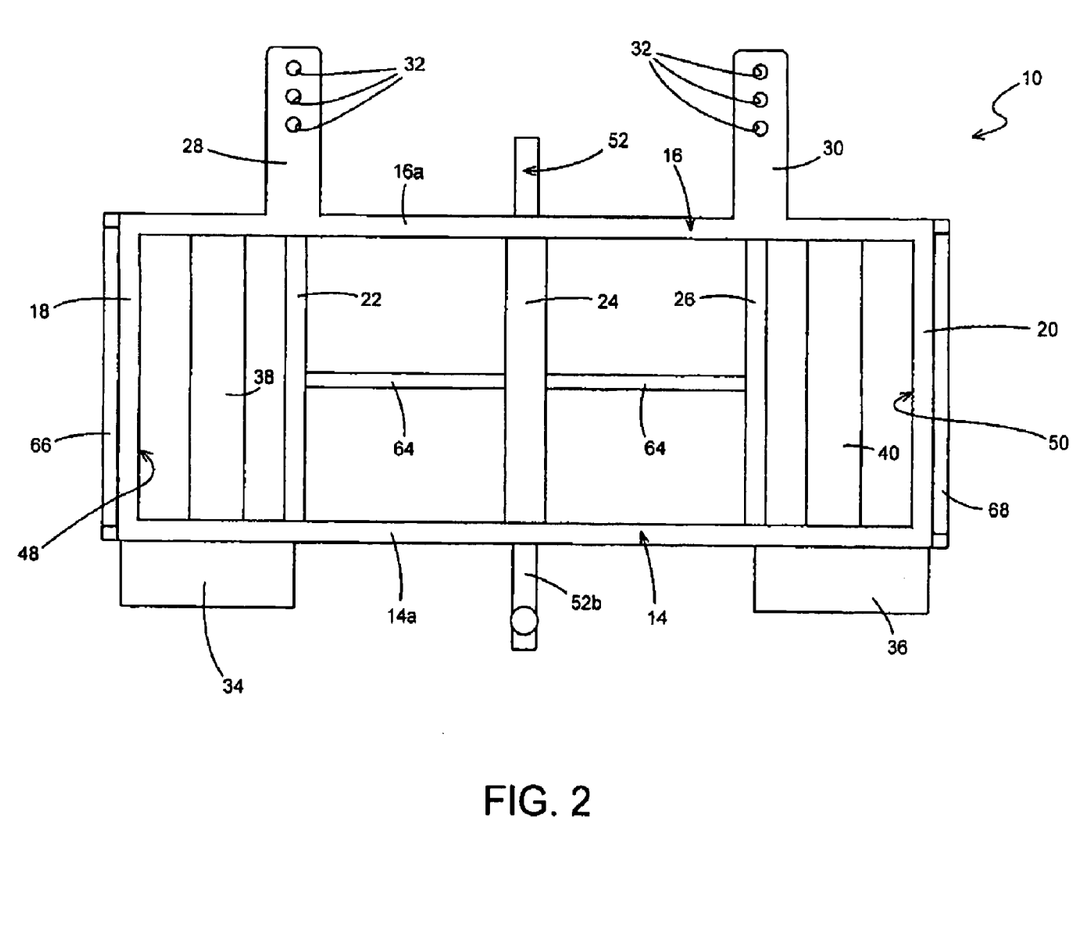
FIG. 2 is a top view of the truck bed extender of FIG. 1.

A pair of connector brackets 28, 30 extend rearwardly away from rear bar 16 and are substantially coplanar with the upper surface 16a of rear bar 16. Connector brackets 28, 30 preferably are integrally formed with rear bar 16, but may alternatively be secured to rear bar 16 by welding, bolting or other suitable connection means. Each connector bracket 28, 30 includes a plurality of spaced apart holes 32 therein. Holes 32 are designed to receive a plurality of bolts (not shown) therethrough to secure frame 12 to the bed of a truck as will be hereinafter described.

Figure 5:
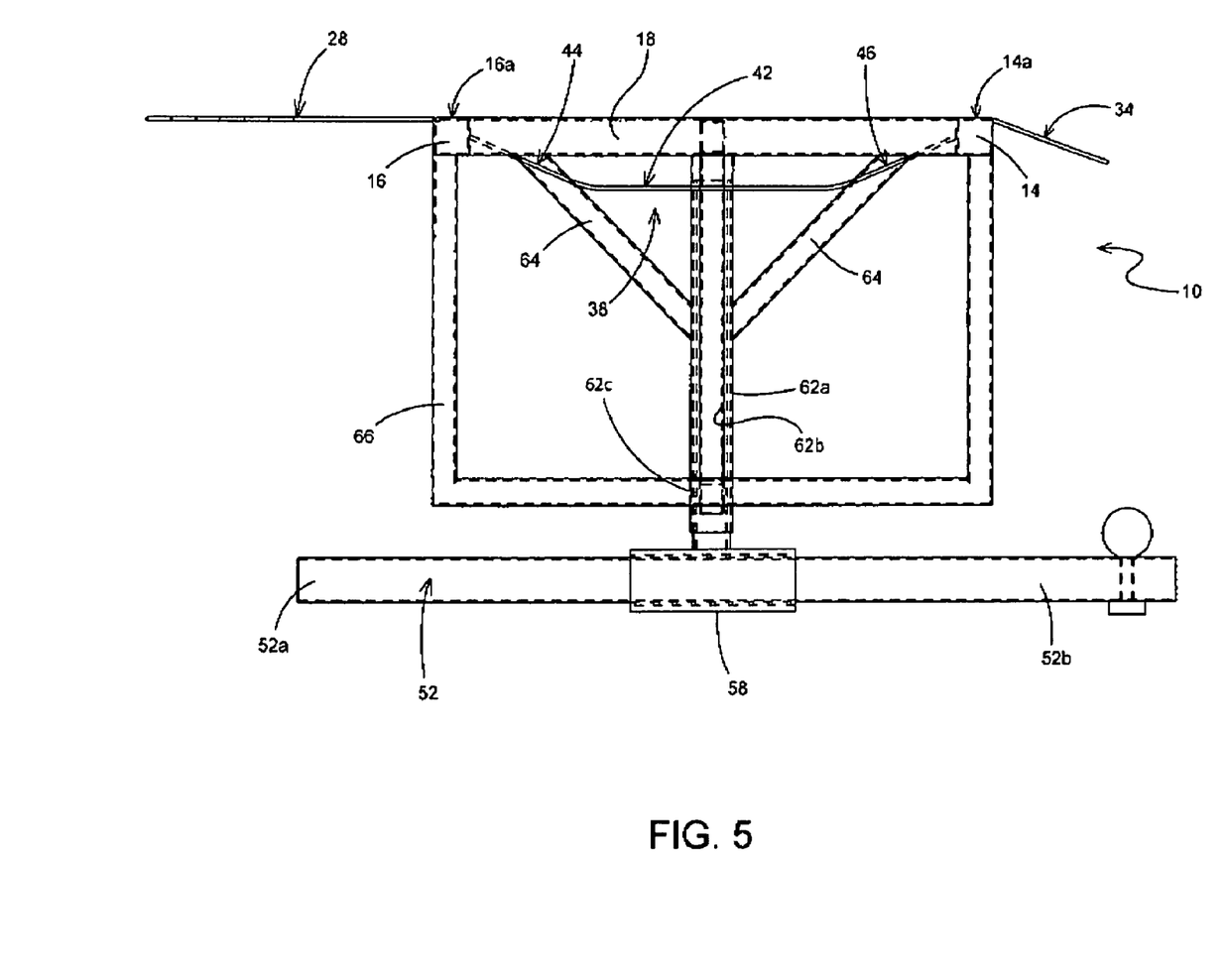
FIG. 5 is a partial cross-sectional side view of the truck bed extender of FIG. 1.

A pair of ramp supports 34, 36 are connected to front bar 14 of frame 12, preferably by welding. As seen in FIG. 5, ramp supports 34, 36 angle downwardly from the upper surface 14a and toward the ground.

A pair of support brackets 38, 40 are connected between front and rear bars 14, 16. Support bracket 38 is disposed between side 18 and cross bar 22, while support bracket 40 is disposed between side bar 20 and cross bar 26. Support brackets 38, 40 are substantially identical, each being of an open U-shape (FIG. 5) and including a flat middle portion 42 with inclined portions 44 and 46 extending upwardly from either end thereof. Middle portion 42 extends below the plane of frame 12. Side bar 18, cross bar 22 and portions of front bar 14 and rear bar 16 form a first wheel well 48 that has support bracket 38 therein. Side bar 20, cross bar 26 and portions of front and rear bars 14, 16 form a second wheel well 50 that has support bracket 40 therein. First wheel well 48 is adapted to receive a first ATV tire therein and second wheel well 50 is adapted to received a second ATV tire therein.

Figure 6:
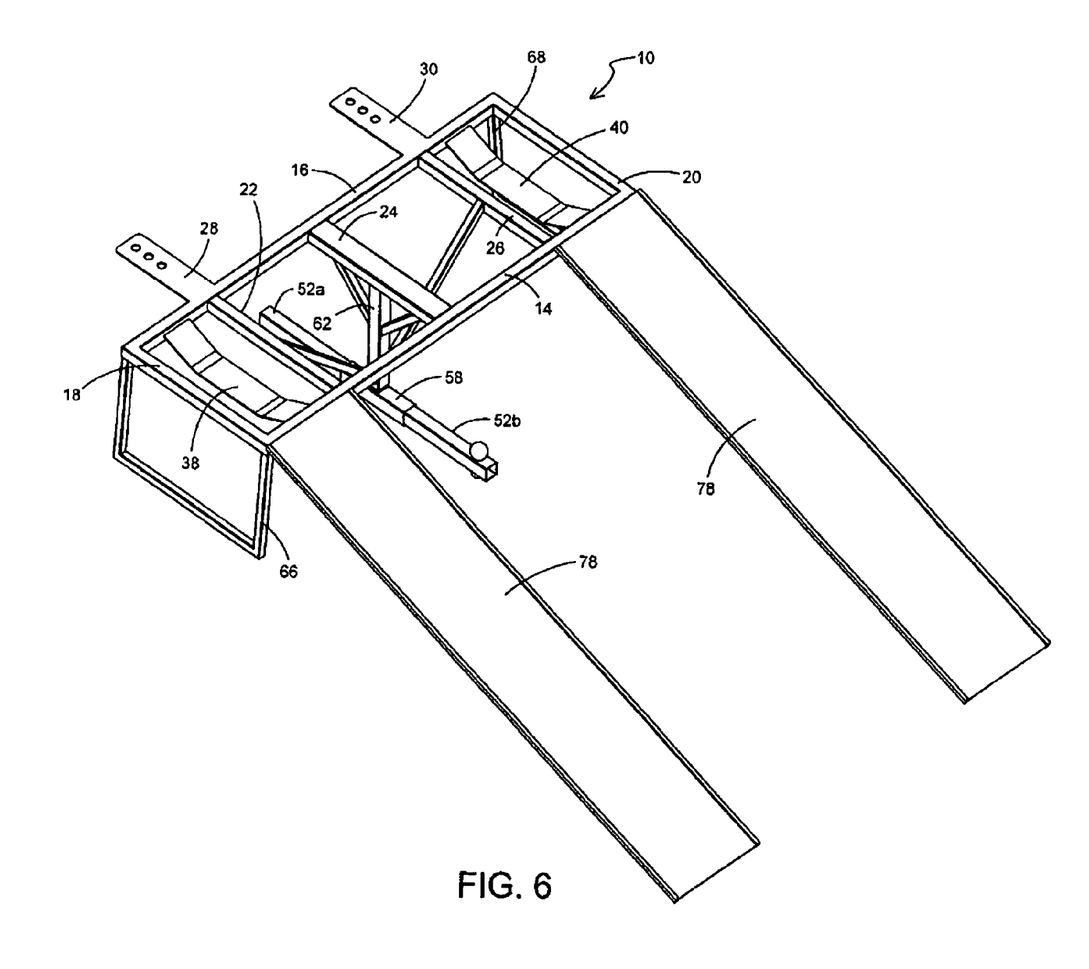
FIG. 6 is a perspective view of the truck bed extender of FIG. 1 including detachable ramps that enable a larger ATV or other vehicle to be placed on the bed of a truck.
Figure 7:
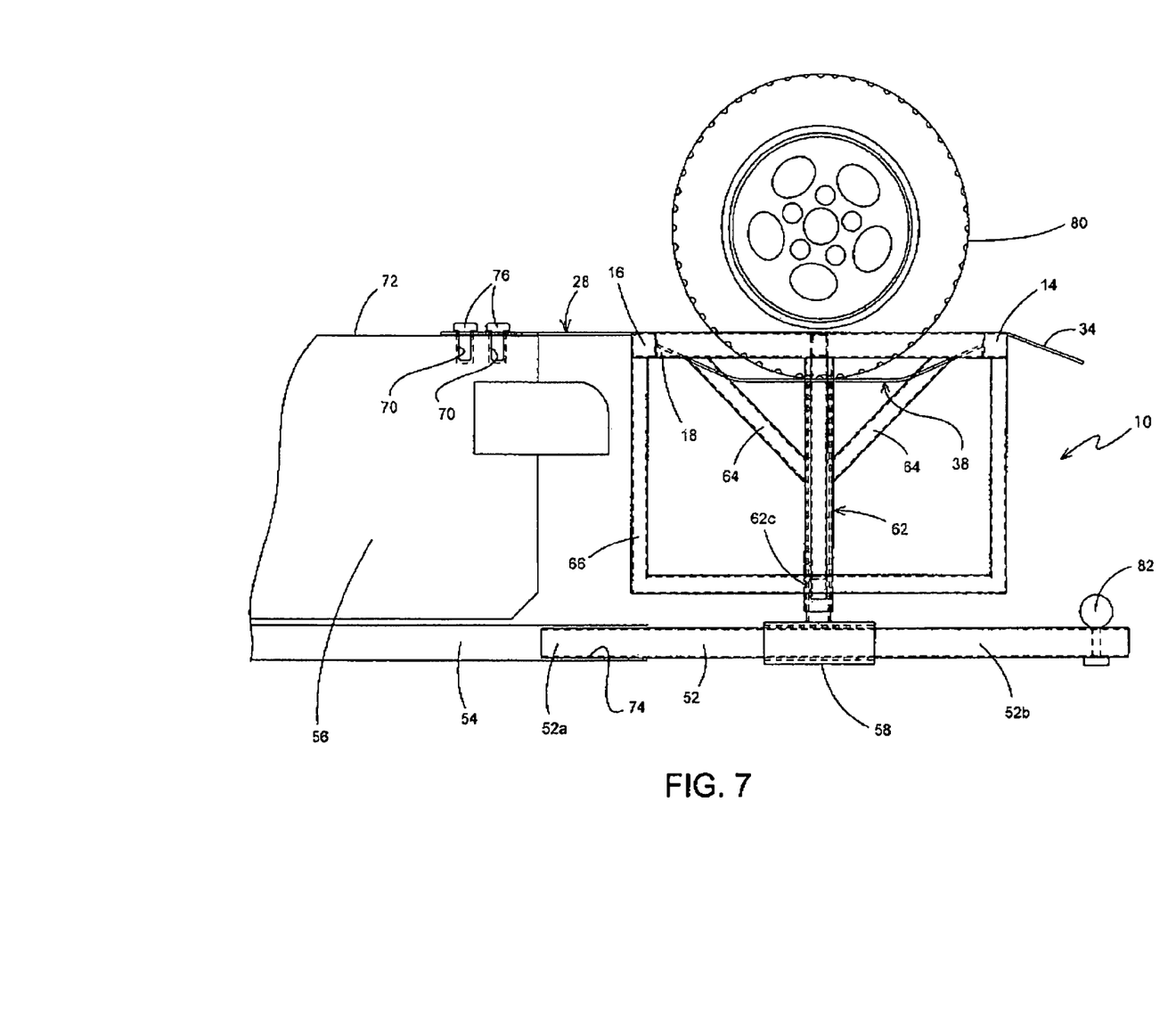
FIG. 7 is a side view of the truck bed extender mounted onto the bed of a truck.

Referring to FIGS. 5-7, there is shown a longitudinal support 52 that has a first end 52a that is configured to be received within a receiver hitch 54 of a truck 56. A second end 52b of support 52 protrudes through the aperture of a short horizontal hollow support member 58 for attachment of an optional hitch ball 82. Hitch ball 82 is secured to support 52b by any suitable conventional means.

A telescoping strut 62 extends upwardly from the upper surface of support 52. Strut 62 is selectively adjustable to vary the distance between support 52 and connector bracket 28, 30 and to thereby allow extender 10 to be mounted to a variety of different truck bodies. A plurality of support brackets 64 extend between an upper portion 62a of strut 62 and cross bars 22, 24 and 26.

A pair of U-shaped side frames 66, 68 may optionally extend downwardly from the bottom surface of side bars 18, 20, respectively. Side frames 66, 68 are provided to allow for easier access into the truck bed and act as a ladder for entry thereto.

Figure 1A:
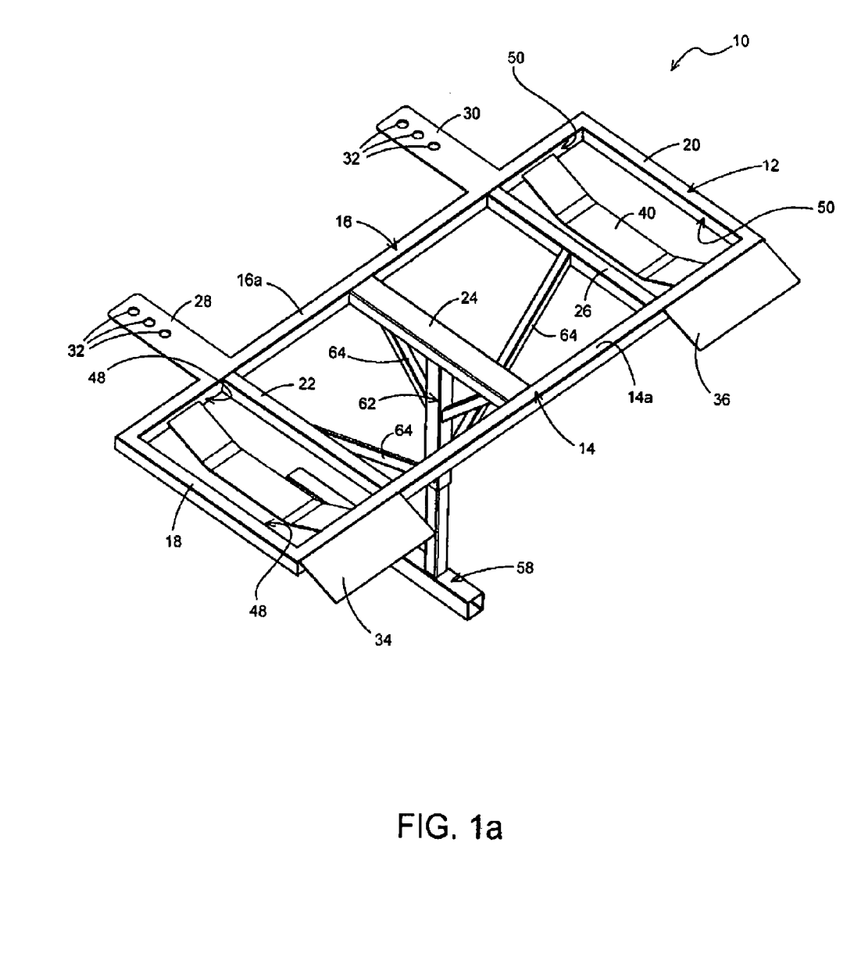
FIG. 1a is a perspective view of the truck bed with the optional trailer hitch extension and side frames removed therefrom.

FIG. 1a shows extender 10 where the optional side frames 66, 68 and hitch 60 are removed.

Figure 3:
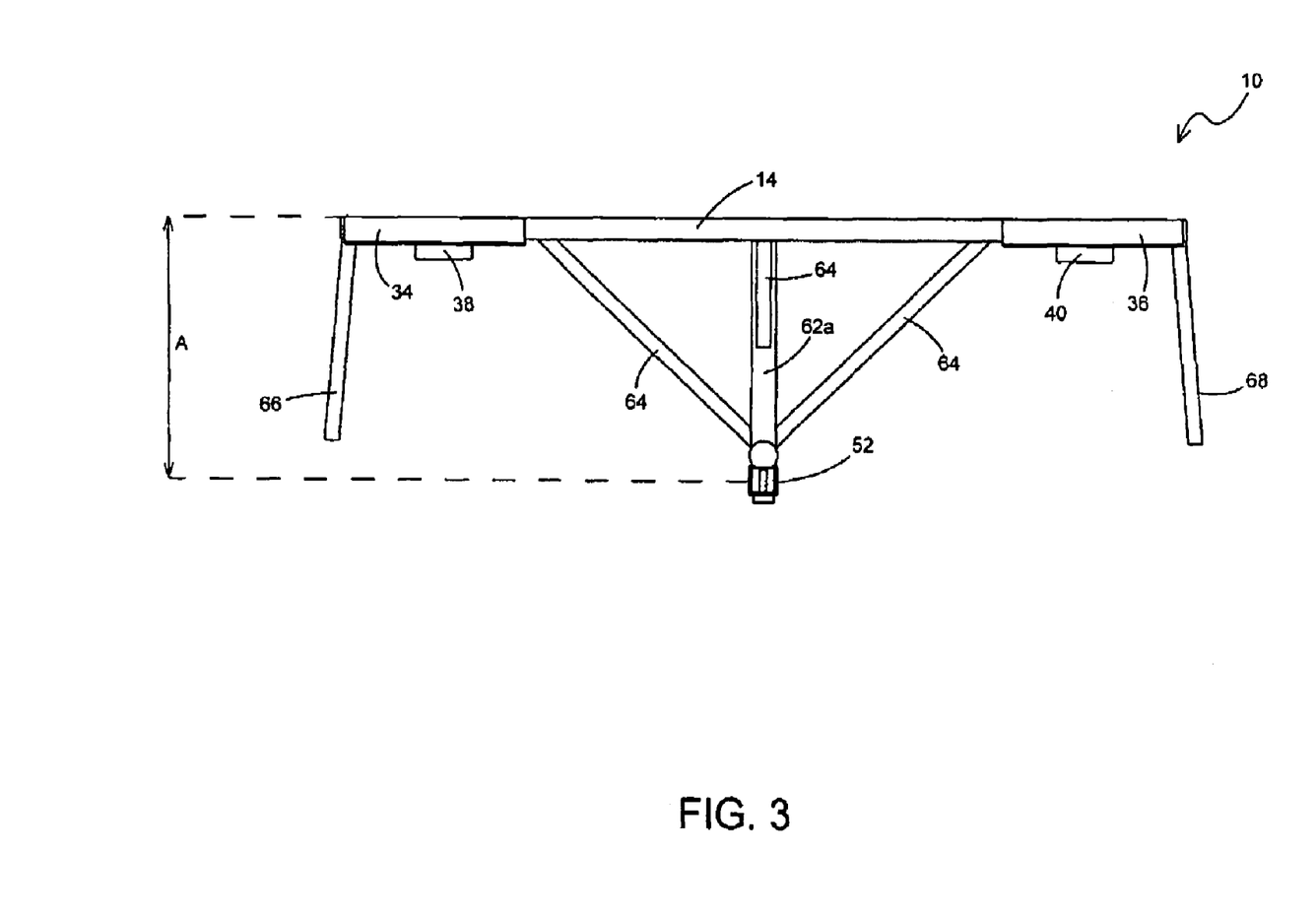
FIG. 3 is a rear view of the truck bed extender of FIG. 1 adjusted for minimum vertical height.
Figure 4:
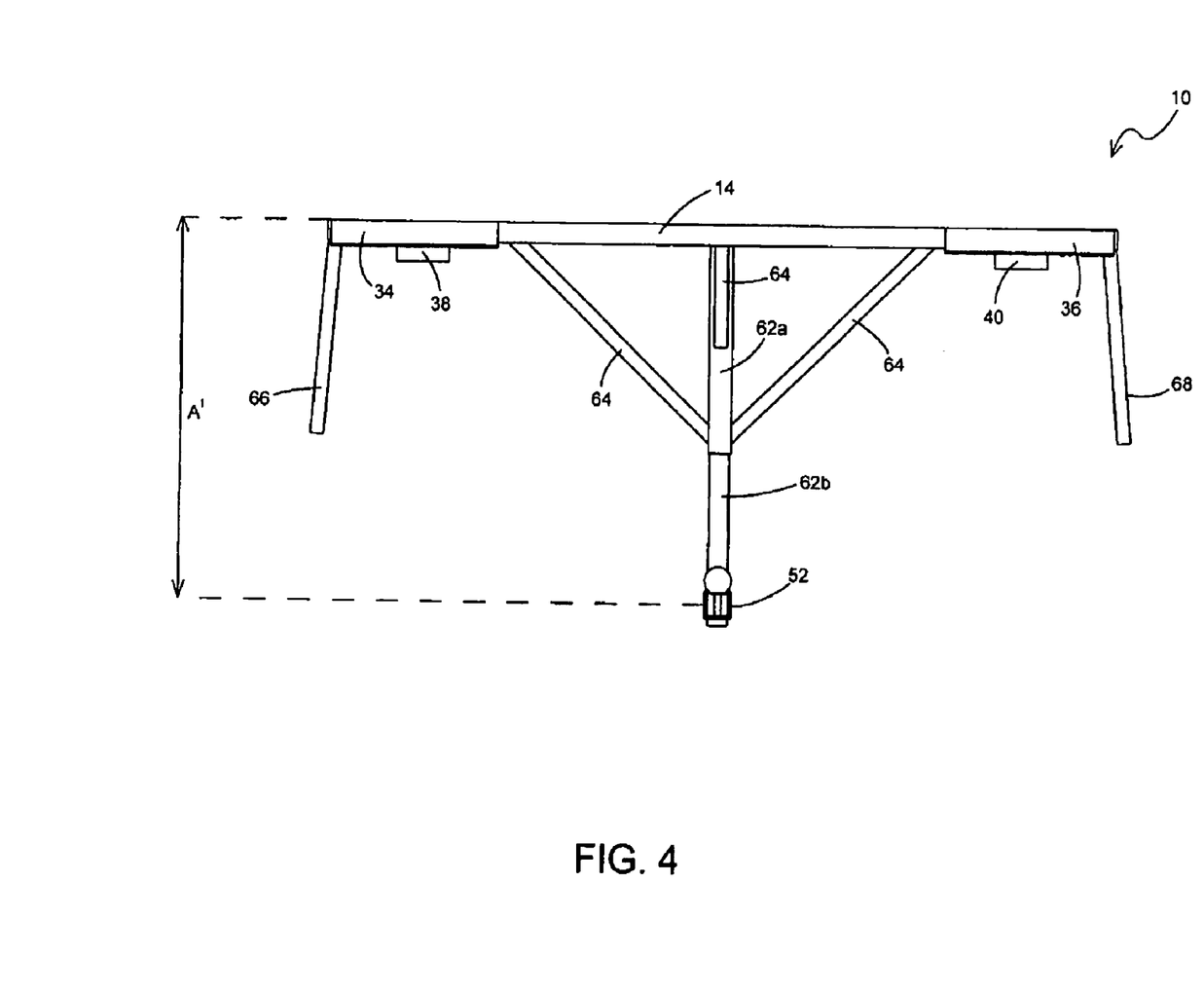
FIG. 4 is a rear view of the truck bed extender of FIG. 1 adjusted for maximum vertical height.

The extender 10 in accordance with the present invention is used in the following manner. The bed bolts (not shown) are removed from the truck 56 leaving a plurality of empty holes 70 in the bed 72 of the truck where the mounting bolts (not shown) were engaged. The relative distance "A" and "A'" (FIGS. 3&4) between the connector brackets 28, 30 and the longitudinal support 52 is adjusted to accommodate different truck and hitch 56, 54 combinations. This is accomplished by telescoping the lower portion 62b of strut 62 either into or out of the upper portion 62a thereof until the correct distance exists. FIG. 3 shows an instance where substantially all of the lower portion 62b of strut 62 is retained within the bore of the upper portion 62a. FIG. 4 shows an instance where some or all of the lower portion 62b extends outwardly from upper portion 62c. Consequently, the distance "A'" is longer than the distance "A". A mechanism, or any other suitable conventional means, may be provided to lock the upper and lower portions 62a, 62b in place. FIG. 5 and FIG. 7 illustrate multiple aperture pairs 62c in at least the lower portion 62b, or both the lower portion 62b and upper portion 62a, which may accept fasteners (not shown) as are conventionally found in strut locking mechanisms.

Once the correct distance "A" or "A'" has been set, the first end 52a of the extender's longitudinal support 52 is slidingly engaged in the aperture 74 in the truck's receiver hitch 54 and, simultaneously, connector brackets 28, 30 are slid over the upper surface of truck bed 72. Support 52 is then secured to hitch 54 in the conventional manner. Furthermore, one or more bolts 76 are inserted through one or more holes 32 in brackets 28, 30 and into correspondingly aligned holes 70 in bed 72. Extender 10 is now in condition for loading of a vehicle into truck 56.

A pair of ramps 78 is placed between ramp supports 34, 36 and the ground. The vehicle to be loaded onto truck 56 is moved up ramps 78 and onto bed 72. In the case of an all terrain vehicle, one or more pairs of wheels (not shown) rest on bed 72 and a pair of wheels 80 of said vehicle is received within wheel wells 48, 50 and rest upon support brackets 38, 40. Because the middle sections 46 of support brackets 38, 40 are recessed with respect to frame 12, the tendency of the vehicle to roll off bed 72 is substantially reduced. The vehicle may be secured to the truck 56 by a plurality of ropes and cables (not shown).

The optional hitch 60 is provided with a ball 82 to allow for attachment of any other towed vehicle (not shown).

Figure 8:
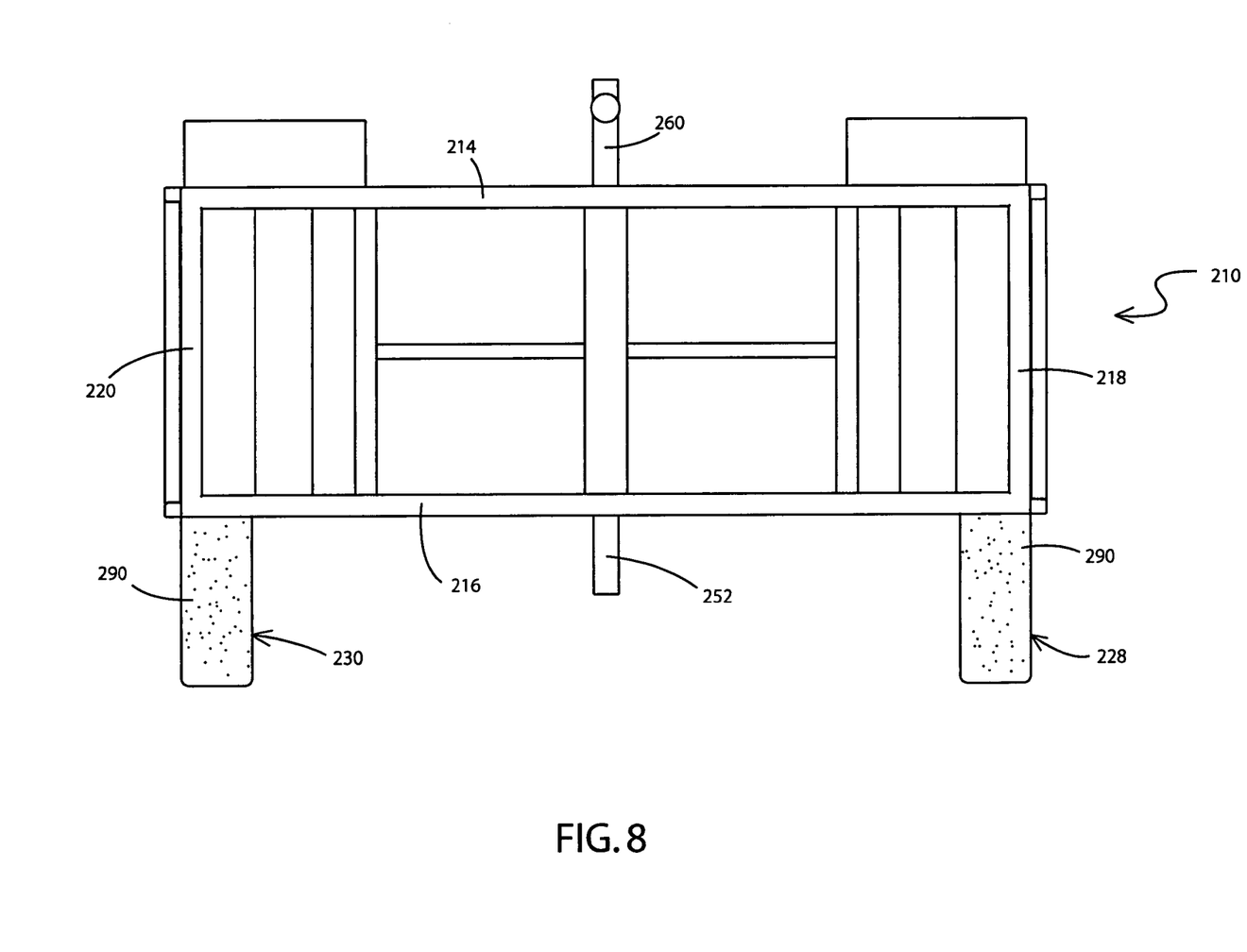
FIG. 8 is a top view of a second embodiment of the truck bed extender in accordance with the present invention.

A second embodiment of the extender is shown in FIG. 8 and is generally indicated at 210. Extender 210 is substantially identical with extender 10 except for the location of connector brackets 228, 230. Connector brackets 228, 230 extend outwardly from rear bar 216 proximate side bars 218, 220 and are provided with a rubber covering 290. This combination allows brackets 228, 230 to frictionally engage the truck bed and side walls (not shown). The longitudinal support 252 is connected and supported by the truck hitch (not shown) and the optional hitch 260 extends out forwardly from extender 210 and beyond front bar 214.

It will be understood that the first end 52a of longitudinal support 52 can be manufactured to connect to any other type of trailer hitch without departing from the spirit of the present invention. Furthermore, second end 52b of longitudinal support 52 can act directly as a receiver-type hitch instead of the ball type hitch connector shown in the attached figures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An extender for a bed of a truck; said extender comprising:
a frame having a front end, a rear end and sides; said frame including a pair of spaced apart wheel wells that extend downwardly therefrom; and said wheel wells being adapted to receive one of a pair of wheels of a vehicle that is to be carried partially on the truck bed and partially on the extender;
at least one connector bracket extending outwardly from the rear end of the frame and being adapted to rest upon a rearward portion of the truck bed;
a strut extending downwardly from the frame;
a longitudinal support extending rearwardly from the strut and being adapted to engage a hitch mounted on the truck a spaced distance below the bed.

2. The truck bed extender as defined in claim 1, wherein the at least one connector bracket includes a plurality of holes adapted to receive a fastener to secure the bracket to the truck bed.

3. The truck bed extender as defined in claim 1, wherein the at least one connector bracket includes a rubber covering that is adapted to frictionally engage at least one of the truck bed and a side wall of the truck for lateral stability.

4. The truck bed extender as defined in claim 1, wherein the at least one connector bracket is substantially coplanar with an upper surface of the frame.

5. The truck bed extender as defined in claim 1, wherein the strut extends downwardly from the frame and substantially at right angles thereto.

6. The truck bed extender as defined in claim 5, further including a plurality of bracket stabilizers extending outwardly and diagonally from the strut to the frame.

7. The truck bed extender as defined in claim 6, wherein the strut comprises an upper portion that is connected to the frame and a lower portion that is connected to the longitudinal support.

8. The truck bed extender as defined in claim 7, wherein the upper portion of the strut is fixedly connected to the frame and includes an axial bore therein; and wherein a first end of the lower portion is received in the axial bore of the upper portion and a second end of the lower portion is fixedly connected to the longitudinal support.

9. The truck bed extender as defined in claim 8, wherein the lower portion of the strut is slidably received in the axial bore of the upper portion and is movable between a first position where the lower portion of the strut is substantially entirely contained within the bore; and a second position where substantially the entire lower portion extends outwardly from the upper portion of the strut.

10. The truck bed extender as defined in claim 9, wherein the at least one connector bracket is disposed a vertical distance away from the longitudinal support; and wherein this vertical distance is selectively adjustable by sliding the lower portion of the strut one of into and out of the bore in the upper portion of the strut.

11. The truck bed extender as defined in claim 10, further comprising a locking mechanism for securing the lower portion of the strut to the upper portion of the strut at any one of a number of selected positions between the first position and the second position.

12. The truck bed extender as defined in claim 11, wherein each wheel well includes a support bracket therein, said support bracket including a substantially flat middle section and a pair of inclined sections, each inclined section extending outwardly away from an end of the middle section.

13. The truck bed extender as defined in claim 12, wherein the frame further includes at least one U-shaped side frame that is connected to the frame and extends vertically downwardly therefrom.

14. The truck bed extender as defined in claim 13, wherein the frame includes a front bar, a rear bar and a pair of opposed side bars; and wherein the at least one U-shaped side frame extends downwardly from a lower surface of one of the side bars and is disposed so as to hang vertically below said side bar.

15. The truck bed extender as defined in claim 14, wherein the longitudinal support includes a first end that is adapted to engage the hitch of the truck; and the support includes a second end remote therefrom that has an axial aperture therein; and wherein the extender further comprises a hitch mechanism that is detachably connected to the second end of the longitudinal support and is adapted to secure a trailer to be towed by the truck.

16. The truck bed extender as defined in claim 15, wherein the frame further includes a pair of parallel spaced apart ramp supports that extend downwardly from the frame and at an acute angle thereto.

17. The truck bed extender as defined in claim 16, further comprising a pair of ramps, said ramps being detachably engageable with the ramp supports on the frame; said ramps being adapted to extend between the frame and a ground surface and to support a vehicle as it is loaded onto the bed of a truck.

\* \* \* \* \*